United States Patent [19]
Gold

[11] Patent Number: 5,476,323
[45] Date of Patent: Dec. 19, 1995

[54] PLASTIC BAG WITH IMPROVED ADHESIVE CLOSURE

[76] Inventor: Peter Gold, 465 N. Wood Rd., Rockville Centre, N.Y. 11570

[21] Appl. No.: 436,754

[22] Filed: May 8, 1995

[51] Int. Cl.⁶ .................... B65D 33/18; B65D 27/14
[52] U.S. Cl. .................. 383/211; 383/86; 229/80.5
[58] Field of Search ................. 383/84, 86, 210, 383/211; 229/80, 80.5

[56] References Cited

U.S. PATENT DOCUMENTS 2,066,495  1/1937  Swift .................................... 229/80
3,256,941  6/1966  Rivman ................................. 383/86
4,192,448  3/1980  Porth ................................. 383/86 X Primary Examiner—Jes F. Pascua

[57] ABSTRACT

A plastic bag having a flap closed "permanently" when placed in contact with an adhesive deposited as a strip in facing relation to the flap, and prior thereto functioning to provide a reusable "temporary" closure when contacting only a nominal amount of the adhesive strip that is permitted to contact the flap through spaced openings in a release strip, the release strip being removed to expose the entire adhesive strip when converting from the temporary to the permanent flap closure.

1 Claim, 2 Drawing Sheets

PLASTIC BAG WITH IMPROVED ADHESIVE CLOSURE

BACKGROUND OF THE INVENTION

1. Field of the Invention

The present invention relates generally to an improved versatile closure for a plastic bag and, more particularly, to a plastic bag embodied with a well-known permanent adhesive closure which, however, prior to being used as such, is adapted to provide a temporary reusable closure so that the bag contents is accessible or changeable, or otherwise benefitted by the optional closure.

Example of the Prior Art

Illustrated and described in U.S. Pat. No. 3,203,621 issued to D. J. Wright for Resealable Bag-Top Closures on Aug. 31, 1965 is a bag-top closure formed as a folded card between which the bag open end is inserted wherein one full surface on one side of the fold line adhesively attaches to the back panel of the bag and the surface on the other side of the fold line having only tack-like adhesive deposits to engage the front panel of the bag, are readily disengaged without rupture of the bag plastic construction material, thereby providing the bag with a reusable bag-top closure. The patented bag-top closure is not an integral part of the plastic bag and provides only the single reusable closure disclosed.

2. Description of the Prior Art

Broadly, it is an object of the present invention to provide an integral plastic bag adhesive closure overcoming the foregoing and other shortcomings of the prior art.

SUMMARY OF THE INVENTION

More particularly, it is an object to adopt a current well known plastic bag permanent adhesive closure of a type provided by an adhesive deposit thereon exposed for use upon removal of a covering release strip, to also provide a reusable adhesive closure prior to removal of the release strip, so that the bag user has an option in how the bag is to be sealed, which correspondingly significantly contributes to the end use and utility of the bag, all as will be better understood as the description proceeds.

BRIEF DESCRIPTION OF THE DRAWING

The description of the invention which follows, together with the accompanying drawings should not be construed as limiting the invention to the example shown and described, because those skilled in the art to which this invention appertains will be able to devise other forms thereof within the ambit of the appended claims.

FIGS. 1–6 are perspective views of the within inventive plastic bag embodied with a reusable temporary and permanent adhesive closure in which FIGS. 1–3 illustrate the reusable temporary closure, and FIGS. 4–6 illustrate the permanent closure.

DESCRIPTION OF THE PREFERRED EMBODIMENT

Figure 1:
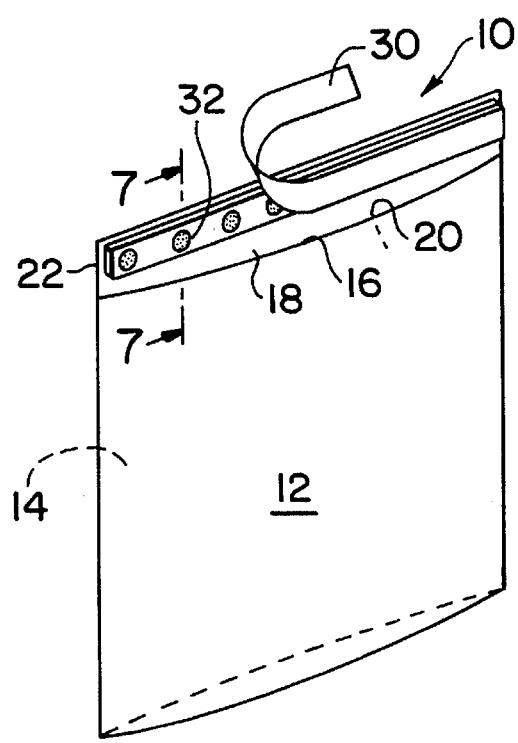

In FIGS. 1–6 there is shown a plastic bag 10 having front and rear panels 12 and 14 in facing relation to each having an edge 16 and adjacent area 18 bounding an opening 20 into the bag. An extension of the rear panel 14 forms a flap 22 which in a known manner, to provide for closure of the opening 20, has applied thereon a deposit or strip 24 of an appropriate adhesive over which there is also positioned an adhesive inert release strip 26.

In accordance with the present invention, and for a reason that will be better understood as the description proceeds, the release strip 26 is not embodied as in the prior art to completely cover the adhesive strip 24, but has spaced openings therealong, individually and collectively designated 28, each of which opening is preferably, for an 8½×11 inch bag 10, of ¼ inch diameter, and horizontal alignment thereof is centrally located in the preferably ½ inch wide 8½ inch release strip 26. Completing the closure structure of the bag 10 is a second release strip 30 which is disposed in covering relation over the release strip 26, being held in place by the excess of the adhesive deposit 24 which extends through the openings 28, said second release strip 30 being provided only to prevent inadvertent adhesive attachments from occurring and to this extent facilitating the handling of one or a stack of the bags 10.

Referring to FIGS. 1–3 and FIG. 7 which demonstrate the reusable temporary closure provided for the plastic bag 10, the said second release strip 30 is removed to expose the said first release strip 26. As best understood from FIG. 7 in which the specific opening 28' is illustrated, the opening 28' is bounded by an edge 32 and the thickness dimension 34 selected for the release strip 26 is less than the thickness of the volume of the adhesive filling the edge-encircled opening 28', so that an adhesive excess 36 extends through the opening 28'.

Underlying the present invention is the recognition that, although the adhesive deposit 24 is constituted in a well known manner to bond to the plastic construction material of the bag panel 12, that said bonding attachment is a function of the area of the adhesive involved in this function, and that consequently a significantly diminished adhesive area will correspondingly provide a diminished adhesive bond. Thus, limited to exposed adhesive only extending through and beyond the openings 28, of which there are nine openings in number in the illustrated bag, the bond resulting is readily undone without rupture of the underlying front panel surface 38, and thus provides the bag 10 with a reusable temporary closure.

Figure 2:
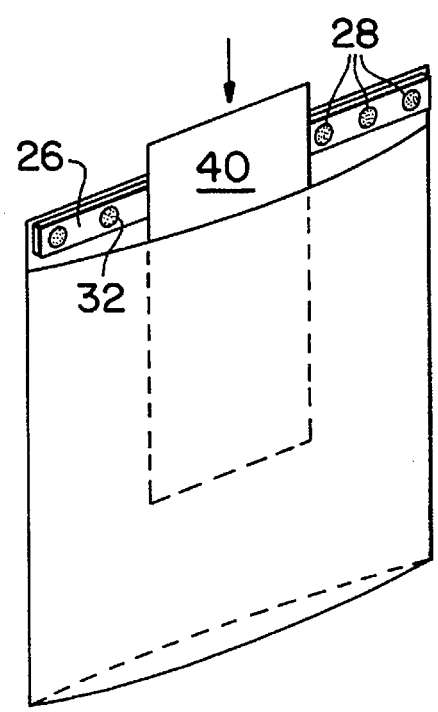
Figure 3:
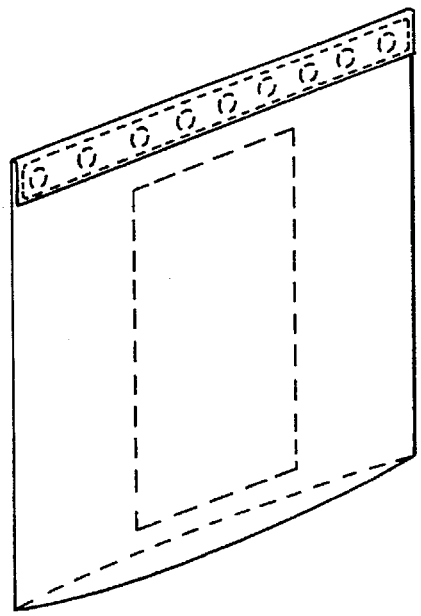
Figure 7:
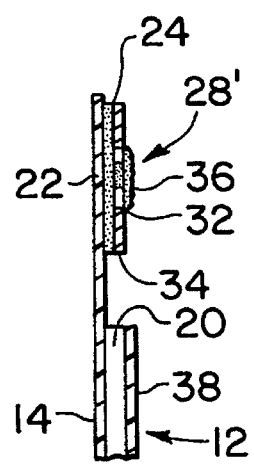
FIG. 7 is an enlarged cross-sectional view, as taken along line 7—7 of FIG. 1, illustrating details of the reusable temporary closure.

The utility of the temporary closure is useful, for example, in inter-office communications. A report 40 is shown in FIG. 2 placed in the bag 10, temporarily sealed as shown in FIG. 3 for privacy or otherwise, and delivered to a recipient for comment, that might include providing proprietary information, and return to the sender.

Figure 4:
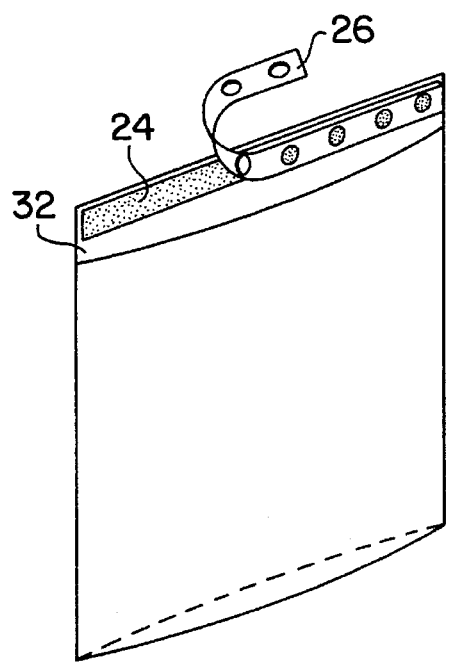
Figure 5:
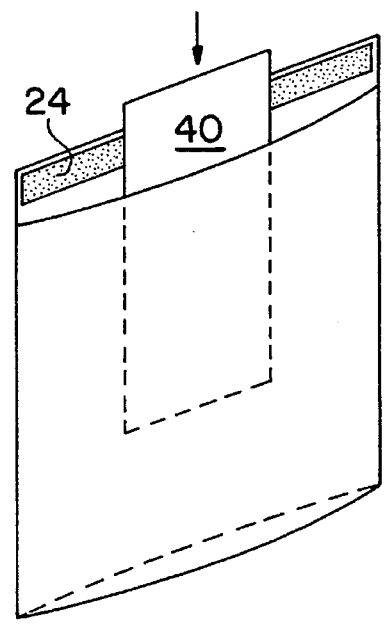
Figure 6:
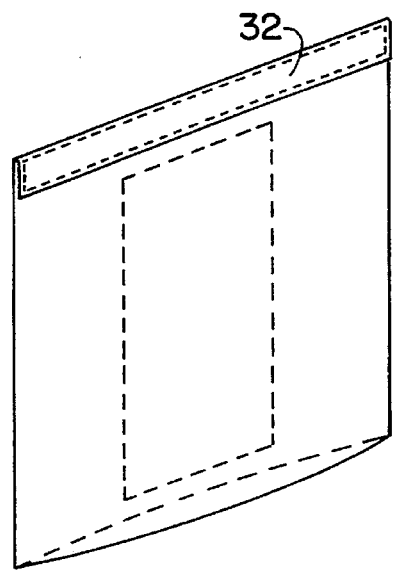

The recipient, preparatory to return to the sender, would remove the remaining release strip 26 thereby exposing the full adhesive deposit 24, and replace the report 40 containing an assumed proprietary comment back into the bag 10, and effect the permanent closure or bag seal, as illustrated by the sequence of FIGS. 4–6.

It should be readily appreciated from the foregoing description that in addition to a known permanent adhesive closure available to a user of the plastic bag 10, that there is also made available a temporary closure, usable on at least one, and additionally more occasions, as the circumstances dictate.

While the double closure plastic bag herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a plastic bag having front and rear panels presenting respectively front and rear edges in facing relation to each other bounding an opening into said bag, said bag opening having a permanent adhesive closure consisting of an adhesive deposit along said rear edge and release strip means in covering relation thereover adapted to be removed therefrom to effectuate said permanent adhesive closure incident to contact of said front edge against said rear edge adhesive deposit, said improvements thereto for contributing to the functioning of said permanent adhesive closure as a reusable temporary adhesive closure comprising said release strip means consisting of two release strips in superposed relation to each other of which said underlying release strip has selected nominally sized openings in spaced relation therealong and said overlying release strip does not, said underlying release strip having a thickness of a selected extent, said adhesive deposit on said rear edge having a thickness of a selected extent only nominally greater than said underlying release strip thickness, and said two release strips having an operative position adhesively secured in covering relation over said adhesive deposit by adhesive exposed through said selected nominally sized openings of said underlying strip in contact with said overlying release strip, said underlying release strip, upon removal of said overlying release strip therefrom, being adapted to expose through each said opening thereof, in facing relation to said front edge, only said rear edge adhesive deposit projecting through said spaced openings and extending said nominal extent forwardly of said underlying release strip thickness, whereby said underlying release strip-restricted adhesive contacting said front edge contributes to a temporary reusable adhesive closure.

* * * * *